United States Patent
Iwasaki (10) Patent No.: US 10,938,051 B2
(45) Date of Patent: Mar. 2, 2021

(54) CELL, CELL STACK DEVICE, MODULE AND MODULE-CONTAINING DEVICE

(71) Applicant: KYOCERA Corporation, Kyoto (JP)

(72) Inventor: Kenichi Iwasaki, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 381 days.

(21) Appl. No.: 15/114,576

(22) PCT Filed: Jan. 29, 2015

(86) PCT No.: PCT/JP2015/052545
§ 371 (c)(1),
(2) Date: Jul. 27, 2016

(87) PCT Pub. No.: WO2015/115554
PCT Pub. Date: Aug. 6, 2015

(65) Prior Publication Data
US 2016/0351935 A1    Dec. 1, 2016

(30) Foreign Application Priority Data
Jan. 29, 2014    (JP) .............................. JP2014-014432

(51) Int. Cl.
*H01M 8/1213*    (2016.01)
*H01M 8/0217*    (2016.01)
(Continued)

(52) U.S. Cl.
CPC .......... *H01M 8/1213* (2013.01); *C25B 13/04* (2013.01); *H01M 8/0217* (2013.01);
(Continued)

(58) Field of Classification Search
None
See application file for complete search history.

(56) References Cited

U.S. PATENT DOCUMENTS 6,887,361 B1    5/2005  Visco et al.
2011/0281194 A1*  11/2011  Higashi .............. H01M 8/0206
                                                             429/458
(Continued)

FOREIGN PATENT DOCUMENTS

CN          102725897 A    10/2012
EP           2530772 A1    12/2012
(Continued)

OTHER PUBLICATIONS

The Extended European Search Report based on Application No. 15 74 2797.2 (5 Pages) dated Jun. 14, 2017 (reference purpose only).
(Continued)

*Primary Examiner* — Zhongqing Wei
(74) *Attorney, Agent, or Firm* — Viering, Jentschura & Partner MBB (57) ABSTRACT

A cell provided with a solid electrolyte layer (4) made from a $ZrO_2$-based sintered member; an inter-connector layer (8) containing a La-containing perovskite composite oxide, including a pair of end portions of the inter-connector layer (8) covering a pair of end portions of the solid electrolyte layer (4); and constituting an annular member with the solid electrolyte layer (4); an outer electrode layer (6) disposed outward of the solid electrolyte layer (4); and an inner electrode layer (3) disposed inward of the solid electrolyte layer (4). In such a cell, the solid electrolyte layer (4) includes a first portion overlapping the pair of end portions of the inter-connector layer (8), and a second portion disposed between the outer electrode layer (6) and the inner electrode layer (3) and having an average thickness of 15 μm or less. Additionally, the first portion is thicker than the second portion.

19 Claims, 8 Drawing Sheets

(51) Int. Cl.
    *H01M 8/1253*    (2016.01)
    *H01M 8/2425*    (2016.01)
    *C25B 13/04*     (2021.01)
    *H01M 8/124*     (2016.01)

(52) U.S. Cl.
    CPC ....... *H01M 8/1253* (2013.01); *H01M 8/2425* (2013.01); *H01M 2008/1293* (2013.01); *Y02E 60/50* (2013.01); *Y02P 70/50* (2015.11)

(56) References Cited

U.S. PATENT DOCUMENTS

| | | | |
|---|---|---|---|
| 2012/0107716 A1 | 5/2012 | Yoshida et al. | |
| 2012/0321982 A1* | 12/2012 | Liu | H01M 8/0256 429/468 |
| 2013/0052559 A1 | 2/2013 | Hori et al. | |
| 2014/0212786 A1 | 7/2014 | Iwasaki et al. | |

FOREIGN PATENT DOCUMENTS

| | | | |
|---|---|---|---|
| JP | H1116583 A | | 1/1999 |
| JP | 2004-265734 A | | 9/2004 |
| JP | 4511122 B2 | * | 7/2010 |
| JP | 4511122 B2 | | 7/2010 |
| JP | 2011113690 A | | 6/2011 |
| JP | 2012054014 A | * | 3/2012 |
| JP | 2012054014 A | | 3/2012 |
| JP | 2012114074 A | | 6/2012 |
| JP | 2012181927 A | | 9/2012 |
| JP | 2012248473 A | | 12/2012 |
| WO | 2013031961 A1 | | 3/2013 |

OTHER PUBLICATIONS

International Search Report (Form PCT/ISA/210) dated Apr. 21, 2015 and issued for PCT/JP2015/052545
Chinese Office Action based on Application No. 201580003711.7 dated Apr. 1, 2017 5 Pages and 4 Pages of English Translation (Reference Purpose Only).

* cited by examiner

CELL, CELL STACK DEVICE, MODULE AND MODULE-CONTAINING DEVICE

TECHNICAL FIELD

The present invention relates to a cell, a cell stack device, a module and a module-containing device.

BACKGROUND ART

In recent years, as a source of next-generation energy, various fuel cell devices have been proposed in which a fuel cell stack device is housed in a housing container. Fuel cell stack devices are formed by electrically connecting a plurality of solid oxide fuel cells in a series.

Such a solid oxide fuel cell formed from an electrically conductive support body that includes a pair of mutually parallel flat faces, contains Ni, and includes fuel gas passages for allowing the flow of fuel gas in the electrically conductive support body has been proposed. A fuel electrode layer, a solid electrolyte layer, and an oxygen electrode layer are laminated sequentially on a first of the pair of mutually parallel flat faces of the electrically conductive support body, and an inter-connector layer is laminated on a second of the pair of flat faces.

Conventionally, solid oxide fuel cells have been constructed such that a pair of end portions of an inter-connector layer containing a dense $LaCrO_3$-based sintered member are joined to a pair of end portions of a solid electrolyte layer made from a dense $ZrO_2$-based sintered member formed so as to surround the periphery of the electrically conductive support body in an airtight manner. Thereby, fuel gas passing through the interior of the electrically conductive support body is prevented from leaking out of the space enclosed by the solid electrolyte layer and the inter-connector layer (e.g. see Patent Literature 1).

CITATION LIST

Patent Literature

Patent Literature 1: Japanese Unexamined Patent Application Publication No. 2004-265734A

SUMMARY OF INVENTION

Technical Problem

In recent years, the thickness of the solid electrolyte layer has tended to decrease in order to improve the power generation performance. However, decreases in the thickness of the solid electrolyte layer lead to the formation of a porous $La_2Zr_2O_7$ layer in all regions in the thickness direction, at end portions of the solid electrolyte layer where the end portions of the inter-connector layer are laminated. Consequently, there is a possibility that gas from inside the solid oxide fuel cell may leak from the edge of the inter-connector layer.

Accordingly, an object of the present invention is to provide a cell, cell stack device, module, and module-containing device whereby power generation performance can be improved and gas leakage from the interior can be prevented.

Solution to Problem

A cell of the present invention is provided with a solid electrolyte layer made from a $ZrO_2$-based sintered member; an inter-connector layer containing a La-containing perovskite composite oxide, including a pair of end portions of the inter-connector layer covering a pair of end portions of the solid electrolyte layer; and constituting an annular member with the solid electrolyte layer; an outer electrode layer disposed outward of the solid electrolyte layer; and an inner electrode layer disposed inward of the solid electrolyte layer. In such a cell, the solid electrolyte layer includes a first portion overlapping the pair of end portions of the inter-connector layer, and a second portion disposed between the outer electrode layer and the inner electrode layer and having an average thickness of 15 µm or less. Additionally, the first portion is thicker than the second portion.

A cell stack device of the present invention is provided with a plurality of the cells described above, and current collection members in electrical connection with the plurality of cells.

A module of the present invention includes the cell stack device described above and a housing container containing the cell stack device therein.

A module-containing device of the present invention includes the module described above, an auxiliary device configured to operate the module, and an external case containing the module and the auxiliary device therein.

Advantageous Effects of Invention

With the cell of the present invention, power generation performance can be improved and gas leakage can be prevented.

The cell stack device, the module, and the module-containing device of the present invention can be configured as a cell stack device, a module, and a module-containing device whereby power generation performance can be improved and gas leakage can be prevented.

BRIEF DESCRIPTION OF DRAWINGS

FIGS. 1A and 1B illustrate an example of a fuel cell of the present embodiment.

FIGS. 4A and 4B illustrate examples of a fuel cell stack device.

FIGS. 7A and 7B illustrate a state where a reinforcing layer has been formed on a bottom portion of the fuel cell.

DESCRIPTION OF EMBODIMENTS

A cell, a cell stack device, a module and a module-containing device will be described using FIGS. 1A to 8. Note that in the following description, the cell is referred to both as "the solid oxide fuel cell" and simply as "the cell". Additionally, the cell stack device is referred to both as "the fuel cell stack device" and simply as "the cell stack device". Additionally, the module is referred to both as "the fuel cell module" and simply as "the module". Additionally, the module-containing device is referred to both as "the fuel cell device" and simply as "the module-containing device".

Figure 1A:
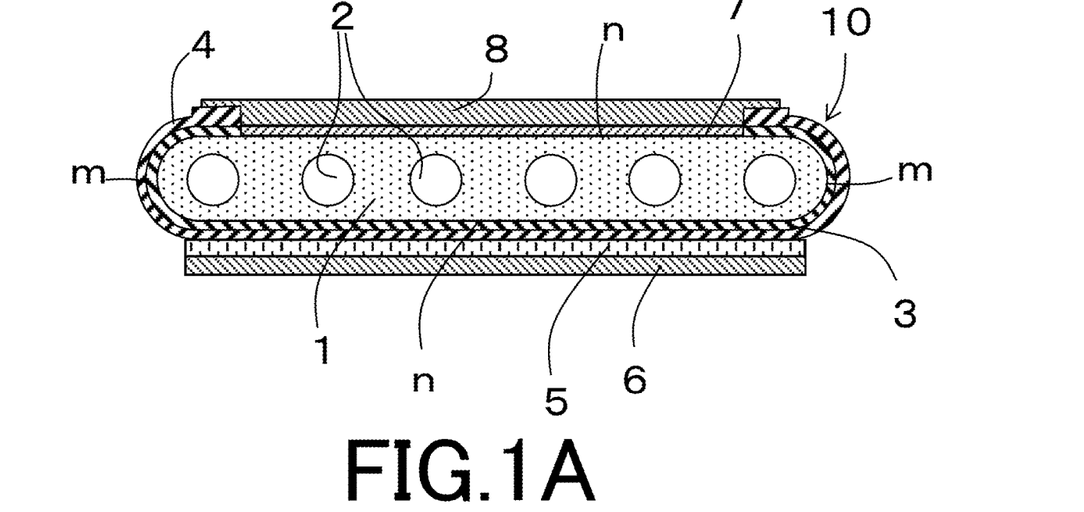
FIG. 1A is a cross-sectional view and FIG. 1B is a side view of FIG. 1A seen from an inter-connector layer side.
Figure 1B:
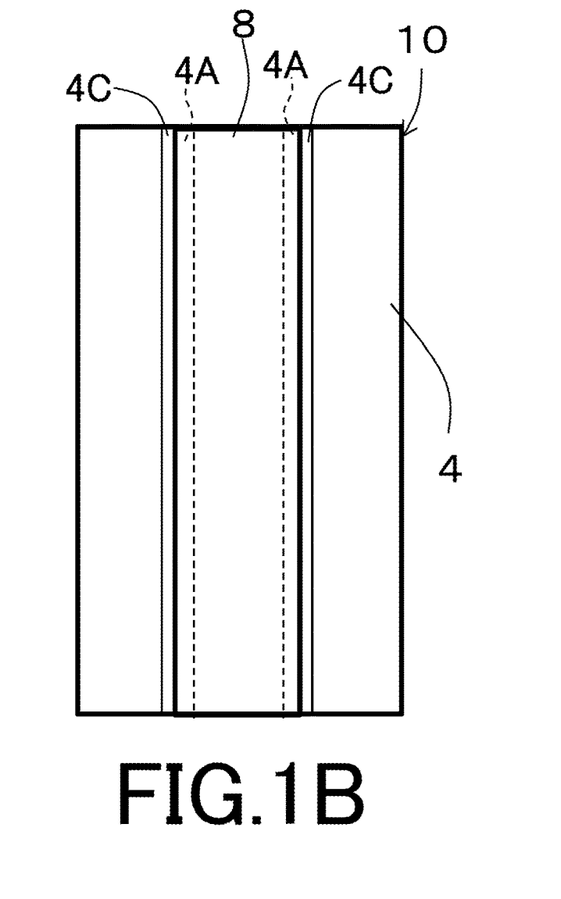

FIGS. 1A and 1B illustrate an example of a fuel cell of the present embodiment. FIG. 1A is a cross-sectional view and FIG. 1B is a side view of FIG. 1A seen from an inter-connector layer side. Here, both figures illustrate enlarged parts configurations of a fuel cell 10.

The fuel cell 10 is a hollow plate type fuel cell and is provided with a Ni-containing porous electrically conductive support body 1 that has a flat cross-section and that, overall, has a flat columnar shape elongated in one direction. A plurality of gas-flow passages 2 disposed at suitable intervals extend in one direction through an interior of the electrically conductive support body 1. In the example of the structure of the fuel cell 10 illustrated in FIG. 1A, a fuel electrode layer 3, a solid electrolyte layer 4, and an oxygen electrode layer 6 are sequentially laminated on a first flat face n (bottom face) of the electrically conductive support body 1. Additionally, an inter-connector layer 8 is disposed on a flat face n (top face) of the electrically conductive support body 1, on a side opposite the oxygen electrode layer 6, with a cohesion layer 7 interposed therebetween.

Below, description will be given of each member constituting the fuel cell 10 of the present embodiment. In the example illustrating the present embodiment an inner electrode layer is described as a fuel electrode layer 3 and an outer electrode layer is described as an oxygen electrode layer 6. Note that, alternately, the fuel cell 10 may have a configuration in which the inner electrode layer is the oxygen electrode layer, the outer electrode layer is the fuel electrode layer, and oxygen-containing gas flows through the gas-flow passages 2.

As illustrated in the example of FIG. 1A, the electrically conductive support body 1 is constituted by a pair of flat faces n facing each other and arcuate faces (side faces) m that connect each of the pair of flat faces n. Both of the flat faces n are formed so as to be substantially parallel to each other.

There is a demand for the electrically conductive support body 1 to have gas permeability in order to allow the fuel gas to pass up to the fuel electrode layer 3 and electrical conductivity for collecting current via the inter-connector layer 8. As such, the electrically conductive support body 1 is formed, for example, from Ni and/or NiO and an inorganic oxide such as, for example, a specific rare earth oxide.

The specific rare earth oxides are used in order to bring the thermal expansion coefficient of the electrically conductive support body 1 close to the thermal expansion coefficient of the solid electrolyte layer 4, and it is possible to use rare earth oxides including at least one element selected from the group consisting of Y, Lu, Yb, Tm, Er, Ho, Dy, Gd, Sm, and Pr in combination with the Ni and/or NiO. Specific examples of such rare earth oxides include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, and $Pr_2O_3$. Among these, $Y_2O_3$ and $Yb_2O_3$ are preferable from the points of view of forming little solid solution with the Ni and/or NiO and having almost no reaction with Ni and/or NiO, the thermal expansion coefficient being similar to that of the solid electrolyte layer 4, and being inexpensive.

In addition, in the present embodiment, from the points of view of maintaining favorable electrical conductivity in the electrically conductive support body 1 and bringing the thermal expansion coefficient close to that of the solid electrolyte layer 4, it is preferable that the Ni and/or NiO and the rare earth oxides are present at a volume ratio of 35:65 to 65:35. Furthermore, any other metal component or oxide component may be added to the electrically conductive support body 1 so long as the required characteristics will not be impaired.

Moreover, since it is necessary for the electrically conductive support body 1 to have fuel gas permeability, the electrically conductive support body 1 generally and preferably has an open porosity greater than or equal to 30%, particularly in the range of from 35 to 50%. In addition, the electrical conductivity of the electrically conductive support body 1 is 300 S/cm or greater, and particularly preferably 440 S/cm or greater.

It should be noted that it is preferable that, in general, the length of the flat faces n of the electrically conductive support body 1 (length in a width direction of the electrically conductive support body 1) be from 15 to 35 mm, the length of the arcuate faces m (length of the arcs) be from 2 to 8 mm, and the thickness of the electrically conductive support body 1 (thickness between the pair of flat faces n) be from 1.5 to 5 mm. The length of the electrically conductive support body 1 is configured to be from 100 to 150 mm.

In the example illustrated in FIG. 1A, the fuel electrode layer 3 is disposed inward of the solid electrolyte layer 4. The fuel electrode layer 3 is disposed covering one of the flat faces n (the bottom face) and the arcuate faces m on both sides of the electrically conductive support body 1. The fuel electrode layer 3, which is to promote an electrode reaction, is preferably formed of porous, electrically conductive ceramic which itself is known. For example, the fuel electrode layer 3 may be formed from a $ZrO_2$ in which rare earth element oxides are dissolved or $CeO_2$ in which rare earth element oxides are dissolved, and Ni and/or NiO. The rare earth element oxide may be any one of the rare earth element oxides cited as the rare earth element oxide used for the electrically conductive support body 1. For example, $ZrO_2$ (YSZ) in which $Y_2O_3$ is dissolved and Ni and/or NiO may be used as the material.

The content of $ZrO_2$ in which rare earth element oxides are dissolved or of $CeO_2$ in which rare earth element oxides are dissolved in the fuel electrode layer 3 is preferably in a range of 35 to 65 volume %, and the content of Ni or NiO is preferably from 65 to 35 volume %. Furthermore, the open porosity of the fuel electrode layer 3 is 15% or greater and particularly preferably in a range of 20 to 40% and the thickness thereof is preferably from 1 to 30 μm.

Additionally, in the example illustrated in FIGS. 1A and 1B, since the fuel electrode layer 3 may be formed at a position facing the oxygen electrode layer 6, for example, the fuel electrode layer 3 may be formed only on the flat face n on the bottom side of the electrically conductive support body 1 on which the oxygen electrode layer 6 is disposed. That is, the fuel cell may have a structure in which the fuel electrode layer 3 is disposed only on the flat face n on the bottom side of the electrically conductive support body 1 and the solid electrolyte layer 4 is formed on the fuel electrode layer 3, on the arcuate faces m on both sides of the electrically conductive support body 1, and on the other top side of the flat faces n of the electrically conductive support body 1 on which the fuel electrode layer 3 is not disposed.

As in the example illustrated in FIG. 1A, the solid electrolyte layer 4 is laminated so as to cover the fuel electrode layer 3. As with the fuel electrode layer 3, the solid electrolyte layer 4 is disposed from one of the flat faces n (the bottom face) of the electrically conductive support body 1, past the arcuate faces m on both sides, to the other of the flat faces n (the top face).

The solid electrolyte layer 4 is made from a $ZrO_2$-based sintered member. The solid electrolyte layer 4 is preferably formed from a dense ceramic made of partially stabilized or stabilized $ZrO_2$ containing a rare earth element oxide such as Y, Sc, and Yb in an amount of from 3 to 15 mol %. Furthermore, the rare earth element is preferably Y from the points of view of inexpensiveness. Provided that $ZrO_2$ is included as the primary component (85 mol % or greater) in the solid electrolyte layer 4, rare earth element oxides and other components may also be included. In the present embodiment, these are referred to in general as the $ZrO_2$-based sintered member. Furthermore, in order to prevent gas permeation, the solid electrolyte layer 4 preferably has a relative density (according to the Archimedes method) of 93% or greater, and particularly 95% or greater.

An anti-reaction layer 5 is formed between the solid electrolyte layer 4 and the oxygen electrode layer 6 to be described later with the object of strengthening the bonding between the solid electrolyte layer 4 and the oxygen electrode layer 6 and preventing the formation of a reactive layer with high electrical resistance due to a reaction between the components of the solid electrolyte layer 4 and the components of the oxygen electrode layer 6.

In the example illustrated in FIG. 1A, the oxygen electrode layer 6 is disposed outward of the solid electrolyte layer 4. The oxygen electrode layer 6 is preferably formed using an electrically conductive ceramic formed of a so-called $ABO_3$ type perovskite oxide. As the perovskite oxide, at least one type of transition metal perovskite oxide containing La, in particular, $LaMnO_3$-based oxide, $LaFeO_3$-based oxide, and $LaCoO_3$-based oxide, in which Sr and La coexist at the A site, is preferable, and $LaCoO_3$-based oxide is particularly preferable from the points of view of high electrical conductivity at an operating temperature of approximately from 600 to 1000° C. Here, Co may be present along with Fe or Mn at the B site in the perovskite oxide described above.

In addition, it is necessary for the oxygen electrode layer 6 to have gas permeability, accordingly, the electrically conductive ceramic (perovskite oxide) which forms the oxygen electrode layer 6 has an open porosity of 20% or greater, and particularly preferably in a range of from 30 to 50%. Furthermore, the thickness of the oxygen electrode layer 6 is preferably from 30 to 100 μm from the points of view of the current collecting property.

As in the example illustrated in FIG. 1A, the inter-connector layer 8 is disposed on the other flat face n (the top face) with the cohesion layer 7 interposed therebetween, where the fuel electrode layer 3 and the solid electrolyte layer 4 are not laminated. Note that a configuration in which the cohesion layer 7 is not provided is also possible.

A pair of end portions of the inter-connector layer 8 cover a pair of end portions of the solid electrolyte layer 4. An annular member is constituted by the inter-connector layer 8 and the solid electrolyte layer 4. Thus, the electrically conductive support body 1 is surrounded by the solid electrolyte layer 4 and the inter-connector layer 8.

In other words, as illustrated in FIG. 1B, the inter-connector layer 8 has a rectangular planar shape and is disposed from the upper edge to the lower edge of the electrically conductive support body 1, and the pair of horizontal end portions of the inter-connector layer 8 are bonded to the surfaces of the pair of end portions of the solid electrolyte layer 4. As a result of this configuration, the fuel gas flowing through the gas-flow passages 2 in the electrically conductive support body 1 will not leak out.

The inter-connector layer 8 includes a La-containing perovskite composite oxide. The inter-connector layer 8 is formed from an electrically conductive ceramic. Since the fuel gas (hydrogen-containing gas) and the oxygen-containing gas come into contact, it is necessary to have reduction resistance and oxidation resistance. For this reason, typically, a lanthanum chromite-based perovskite oxide ($LaCrO_3$-based oxide) is used as an electrically conductive ceramic having reduction resistance and oxidation resistance, in particular, a $LaCrMgO_3$-based oxide in which Mg is present at the B site can be used with the object of bringing the thermal expansion coefficients of the electrically conductive support body 1 and the solid electrolyte layer 4 closer. The inter-connector layer 8 contains the lanthanum chromite-based perovskite oxide ($LaCrO_3$-based oxide) at, for example, an amount of approximately 80 to 95 wt % of the entire layer. Note that the inter-connector layer 8 may include any type of La-containing perovskite composite oxide, an example thereof being a $LaSrTiO_3$-based sintered member. Additionally, while described later, the inter-connector layer 8 may also contain $Y_2O_3$ or a similar rare earth element oxide.

In addition, the thickness of the inter-connector layer 8 is preferably from 10 to 50 μm from the points of view of gas leakage prevention and electrical resistance. In this range, gas leakage can be prevented and the electrical resistance reduced.

Furthermore, the cohesion layer 7 is formed between the electrically conductive support body 1 and the inter-connector layer 8 in order to reduce the thermal expansion coefficient difference between the inter-connector layer 8 and the electrically conductive support body 1, or the like.

A composition similar to the fuel electrode layer 3 can be used as the cohesion layer 7. For example, the cohesion layer 7 may be formed from at least one of a rare earth oxide, $ZrO_2$ in which rare earth element oxides are dissolved, and $CeO_2$ in which rare earth element oxides are dissolved, and Ni and/or NiO. More specifically, the cohesion layer 7 may be formed from, for example, a composition containing $Y_2O_3$, and Ni and/or NiO; a composition containing $ZrO_2$ (YSZ) in which $Y_2O_3$ is dissolved, and Ni and/or NiO; or a composition containing $CeO_2$ in which Y, Sm, Gd, or the like is dissolved, and Ni and/or NiO. Here, the rare earth oxides, or the $ZrO_2$ ($CeO_2$) in which the rare earth element oxides are dissolved and the Ni and/or NiO are preferably set to a volume ratio in a range of 40:60 to 60:40.

In the fuel cell 10 described above, the portion where the fuel electrode layer 3 and the oxygen electrode layer 6 face each other with the solid electrolyte layer 4 interposed therebetween functions as an electrode to generate power. That is, oxygen-containing gas such as air flows to the outside of the oxygen electrode layer 6 and the fuel gas (hydrogen-containing gas) flows in the gas-flow passages 2 in the electrically conductive support body 1 and the gases are heated up to a predetermined operating temperature to generate power. Then, the current generated by the power generation is collected via the inter-connector layer 8 attached to the electrically conductive support body 1.

Figure 2:
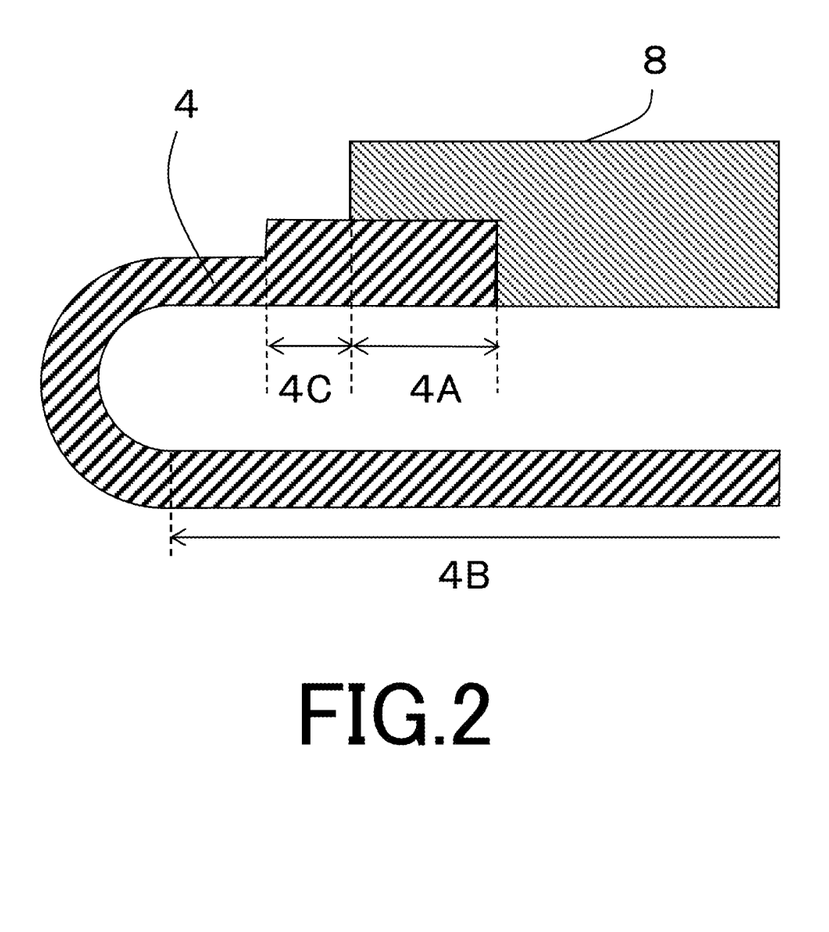
FIG. 2 is a cross-sectional view in which space between an end portion of a solid electrolyte layer and an end portion of the inter-connector layer is enlarged.

FIG. 2 is a cross-sectional view in which space between the end portion of the solid electrolyte layer and the end portion of the inter-connector layer is enlarged.

In recent years, the thickness of the solid electrolyte layer 4 has tended to decrease in order to improve the power generation performance. However, decreases in the thickness of the solid electrolyte layer 4 sometimes lead to the formation of a $La_2Zr_2O_7$ layer in all regions in the thickness direction, at end portions of the solid electrolyte layer 4 where the end portions of the inter-connector layer 8 are laminated. This $La_2Zr_2O_7$ layer has a higher densification temperature than that of $ZrO_2$ and, thus, it is difficult to densify at a sintering temperature of $ZrO_2$ which results in the $La_2Zr_2O_7$ layer being porous. Consequently, there has been a possibility that fuel gas may leak through the electrically conductive support body 1 and the fuel electrode layer 3 at and in the vicinity of the boundary between the inter-connector layer 8 and the solid electrolyte layer 4.

As such, in the present embodiment, as in the example illustrated in FIG. 2, the solid electrolyte layer 4 includes a first portion 4A overlapping the pair of end portions of the inter-connector layer 8, and a second portion 4B disposed between the oxygen electrode layer 6 and the fuel electrode layer 3 and having an average thickness of 15 µm or less. Additionally, the first portion 4A is thicker than the second portion 4B. Due to this configuration, in cases where the average thickness of the solid electrolyte layer 4 is 15 µm or less, even if La is diffused from the inter-connector layer 8, the porous $La_2Zr_2O_7$ layer will only be formed on the inter-connector layer 8 side of the first portion 4A of the solid electrolyte layer 4. Therefore, the formation of the porous $La_2Zr_2O_7$ layer in all regions in the thickness direction of the first portion 4A of the solid electrolyte layer 4 can be prevented. Accordingly, gas leakage from within the fuel cell 10 can be prevented. Therefore, long-term reliability can be improved in the cell stack device, the module, and the module-containing device.

As illustrated in FIG. 2, the solid electrolyte layer 4 includes the first portion 4A and the second portion 4B. Additionally, in the example illustrated in FIG. 2, the solid electrolyte layer 4 also includes a third portion 4C. The third portion 4C is adjacent to the first portion 4A, is a portion on which the pair of end portions of the inter-connector layer 8 are not overlapped, and is thicker than the second portion 4B. With this configuration, even in cases where La is diffused in a direction away from the inter-connector layer 8, the formation of the porous $La_2Zr_2O_7$ layer in all regions in the thickness direction can be prevented in the third portion 4C, not overlapping with the pair of end portions of the inter-connector layer 8.

The average thickness of the second portion 4B disposed between the oxygen electrode layer 6 and the fuel electrode layer 3 is 15 µm or less. This can improve power generation performance. Note that the solid electrolyte layer 4, other than the first portion 4A and the third portion 4C described above, can be set to the same average thickness of 15 µm or less as the second portion 4B.

The average thickness of the first portion 4A overlapping the pair of the end portions of the inter-connector layer 8 is preferably 20 µm or greater. This configuration can prevent La from diffusing in all regions in the thickness direction of the solid electrolyte layer 4 in the portions overlapping the inter-connector layer 8. Additionally, from the perspective of greater La diffusion prevention, the average thickness of the first portion 4A is preferably set to 25 µm of greater. Note that from the perspective of reducing steps, the average thickness of the first portion 4A is preferably set to be 35 µm or less, and more preferably is set to be 30 µm or less.

Additionally, in FIG. 1A, the direction perpendicular to the thickness direction of the first portion 4A, namely the width, is set to about 1 to 10 mm and is greater than the thickness of the first portion 4A.

Figure 3A:
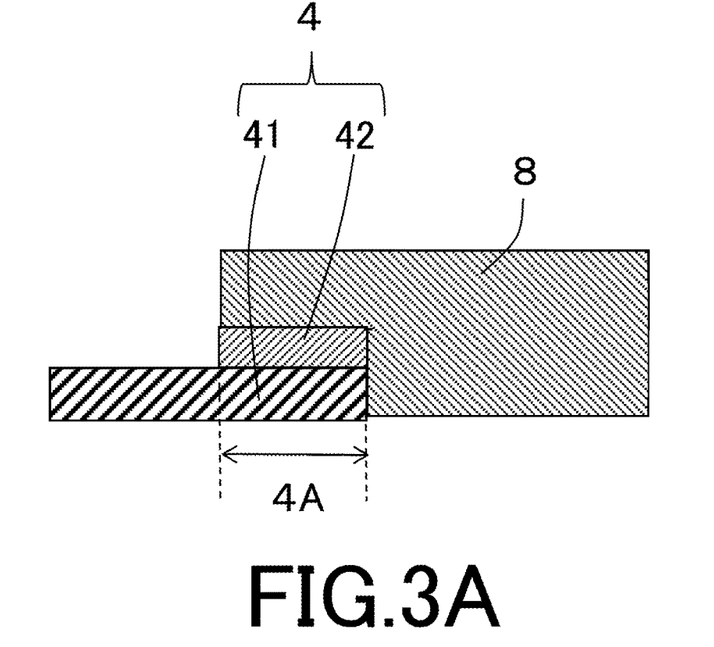
FIGS. 3A and 3B each illustrate another example of the cell of the present embodiment and are cross-sectional views in which space between the end portion of the solid electrolyte layer and the end portion of the inter-connector layer is enlarged.
Figure 3B:
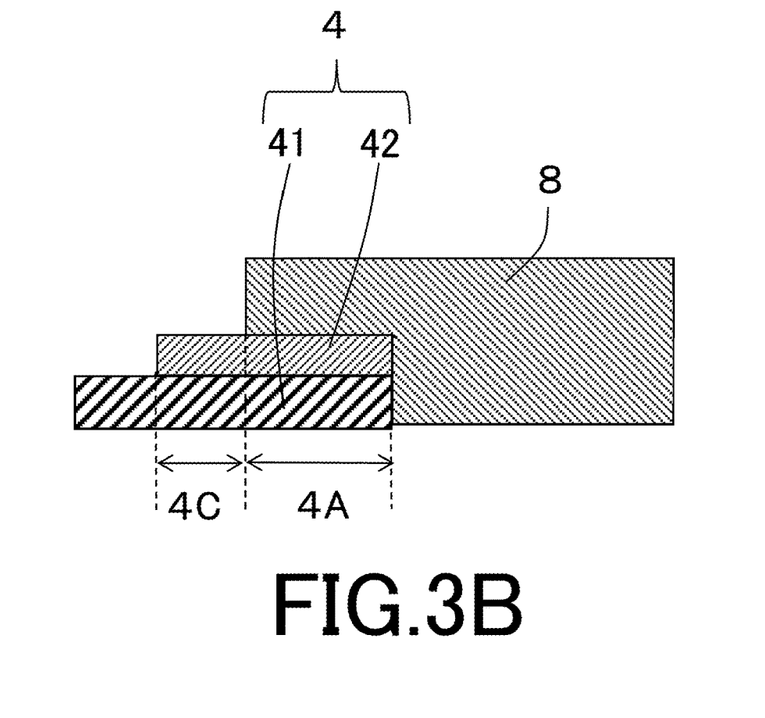

FIGS. 3A and 3B each illustrate another example of the cell of the present embodiment and are cross-sectional views in which space between the end portion of the solid electrolyte layer and the end portion of the inter-connector layer is enlarged.

In the example illustrated in FIG. 3A, the first portion 4A is made from a $ZrO_2$-based sintered member containing a rare earth element oxide, and includes a first layer 41 and a second layer 42 disposed closer to the inter-connector layer 8 than the first layer 41; and the second layer 42 preferably has a lower rare earth element oxide content than the first layer 41. The same rare earth element oxides as those described above can be used here as the rare earth element oxide. As a result, the first layer 41 is covered by the high-strength second layer 42 and, thus, even in cases where the inter-connector layer 8 is subjected to impact, the first layer 41 is protected by the second layer 42. Accordingly, leaking of fuel gas due to damage to the first portion 4A caused by impacts to the inter-connector layer 8 can be prevented.

Additionally, from the perspective of attaining high strength, for example, the second layer 42 is preferably $ZrO_2$ containing less than 8 mol % of the rare earth element oxide. From the perspective of attaining even higher strength, the second layer 42 preferably contains about 3 to 6 mol % of $Y_2O_3$.

Additionally, as in the example illustrated in FIG. 3B, the third portion 4C may have a configuration including the first layer 41 and the second layer 42, identical to the configuration of the first portion 4A. This configuration can protect the first layer 41 by the high-strength second layer 42 in the third portion 4C as well.

Additionally, the inter-connector layer 8 contains the rare earth element oxide and, preferably, the second layer 42 comprises a near portion adjacent to the inter-connector layer and a far portion less adjacent to the inter-connector layer than the near portion, wherein the near portion contains a greater content of the rare earth element oxide in a near portion adjacent to the inter-connector layer 8 in the thickness direction at a content greater than in a thickness direction. With this configuration, the rare earth element oxide in the inter-connector layer 8 will bond with the rare earth element oxide in the inter-connector layer 8 side of the second layer 42. As a result, the connection strength between the second layer 42 and the inter-connector layer 8 can be increased. Accordingly, leaking of fuel gas can be prevented. Note that here, "the inter-connector layer 8 side or near portion adjacent to the inter-connector layer 8" of the second layer 42 is defined as, in a cross-section of the second layer 42, a region from the surface of the second layer 42 on the inter-connector layer 8 side inward about 2 µm. Additionally, the first portion 4A is made from the $ZrO_2$-based sintered member containing a rare earth element oxide and, preferably, has a greater Zr content in a central portion thereof in the thickness direction than in a near portion adjacent to the inter-connector layer 8. As such, the strength of the central portion of the first portion 4A can be increased and, as a result, even when the inter-connector layer 8 is subjected to impact, leaking of fuel gas due to damage to the interior of the first portion 4A can be prevented. Note that the "central portion" of the first portion 4A is defined as a portion located 10 µm inward from the surface of the inter-connector layer 8 side.

Description will be given of an example of the method for manufacturing the fuel cell 10 of the present embodiment described above.

First, for example, a clay is prepared by mixing Ni and/or NiO powder, powder of rare earth oxides such as $Y_2O_3$, an organic binder, and a solvent, an electrically conductive support body compact is manufactured by extrusion molding using the clay, and the result is dried. Here, a calcined body in which the electrically conductive support body compact is calcined for 2 to 6 hours at from 900 to 1000° C. may be used as the electrically conductive support body compact.

Next, for example, the raw materials of NiO and $ZrO_2$ (YSZ) in which $Y_2O_3$ is dissolved are weighed and mixed in accordance with a predetermined formulation composition. After this, a fuel electrode layer slurry is prepared by mixing an organic binder and a solvent in the mixed powder.

Then, a slurry formed by adding toluene, a binder, a commercially available dispersing agent, and the like to $ZrO_2$ powder in which rare earth elements are dissolved is molded using a doctor blade method or the like to manufacture a sheet-shaped solid electrolyte layer compact. At the stage of fabricating this compact, the first portion 4A is made thicker than the second portion 4B. For example, after fabricating a sheet for which the entire sheet has a thickness that is the same as that of the second portion 4B, the first portion 4A may be formed by additionally coating the slurry on the surface of the sheet-shaped solid electrolyte layer compact, that is, on the end portions (portion overlapping the inter-connector layer) of the face on the side opposite the face where the fuel electrode layer is formed, so as to partially increase the thickness.

The same material used for the solid electrolyte layer compact may be used for the additionally coated slurry. Additionally, in cases where forming the first layer 41 and the second layer 42 including the first portion 4A, the additionally coated slurry may constitute the second layer 42. In this case, when the content of the rare earth element oxide in the second layer 42 is configured to be less that in the first layer 41, the content of the rare earth element oxide in the compact of the second layer 42 can be configured to be less than that in the compact of the first layer 41 at the stage of forming the compacts.

Additionally, a greater amount of the rare earth element oxide can be added to a near portion adjacent to the inter-connector layer 8 of the compact of the second layer 42 than a far portion opposite to the near portion in order to form the second layer 42 in which the content of the rare earth element oxide in the near portion adjacent to the inter-connector layer 8 in the thickness direction is greater than the content of the rare earth element oxide in the far portion opposite to the near portion.

Additionally, in cases where forming the first portion 4A in which has a greater Zr content in the central portion than in a near portion adjacent to the inter-connector layer 8, the sheet-shaped solid electrolyte layer compact can be prepared so as to form a compact of the first portion 4A satisfying this condition. Note that in cases where fabricating such a sheet, layers of high Zr content and layers of low Zr content can be appropriately laminated. Specifically, a layer of high Zr content can be disposed in the central portion in the thickness direction and a layer of low Zr content can be disposed on the inter-connector layer 8 side in the thickness direction.

Next, a fuel electrode layer compact is formed by coating and drying the fuel electrode layer slurry on the obtained sheet-shaped solid electrolyte layer compact and a sheet-shaped laminate compact is formed.

The fuel electrode layer compact side surface of the sheet-shaped laminate compact on which the fuel electrode layer compact and the solid electrolyte layer compact are formed is laminated on the electrically conductive support body compact, and a compact is formed.

Note that the solid electrolyte layer compact can be laminated on the electrically conductive support body compact (the fuel electrode layer compact) by coating the fuel electrode layer slurry on a predetermined location of the electrically conductive support body compact and drying. This case is preferable because the desired thickness will be accurately acquired. Additionally, as described previously, laminating the laminate compact of the fuel electrode layer compact and the solid electrolyte layer compact on the electrically conductive support body compact is preferable because processes can be streamlined.

The anti-reaction layer compact is fabricated by, for example, manufacturing a slurry by adding an organic binder and a solvent to $CeO_2$ powder in which $Gd_2O_3$ is dissolved, and coating the slurry on the solid electrolyte layer 4 where the oxygen electrode layer 6 will be formed.

Next, a slurry is manufactured by mixing an inter-connector layer material (for example, $LaCrMgO_3$-based oxide powder), an organic binder, and a solvent.

Next, a cohesion layer compact positioned between the electrically conductive support body 1 and the inter-connector layer 8 is formed. For example, $ZrO_2$ in which Y is dissolved is mixed with NiO in a volume ratio in a range of 40:60 to 60:40, the result is dried, and an organic binder and the like is added thereto to prepare a cohesion layer slurry. The cohesion layer slurry is coated on the electrically conductive support body compact to form the cohesion layer compact.

After this, the inter-connector layer slurry is coated on the cohesion layer compact upper surface such that a pair of end portions of the inter-connector layer compact are laminated on a pair of end portions of the solid electrolyte layer compact. Thus, a laminated compact is produced.

Next, the laminate compact described above is subjected to a binder removal treatment, and co-sintering (co-firing) is carried out in an oxygen-containing atmosphere for 2 to 6 hours at from 1400 to 1450° C. Here, it is also possible to prepare an inter-connector layer slurry, produce an inter-connector layer sheet, laminate an inter-connector layer sheet on the cohesion layer compact upper surface such that the pair of end portions of the inter-connector layer sheet are laminated on the pair of end portions of the solid electrolyte layer compact, and produce a laminate compact.

Furthermore, the fuel cell 10 of the present embodiment with the structure illustrated in FIGS. 1A and 1B can be manufactured by coating a slurry containing a material for an oxygen electrode layer (for example, $LaCoO_3$-based oxide powder), a solvent, and a pore forming agent on an anti-reaction layer by dipping or the like, and carrying out baking for 2 to 6 hours at from 1000 to 1300° C. Thereafter, preferably, hydrogen gas is supplied into the fuel cell 10 and the electrically conductive support body 1 and the fuel electrode layer 3 are subjected to reducing treatment. The reducing treatment is, for example, preferably carried out for 5 to 20 hours at 750 to 1000° C.

Figure 4A:
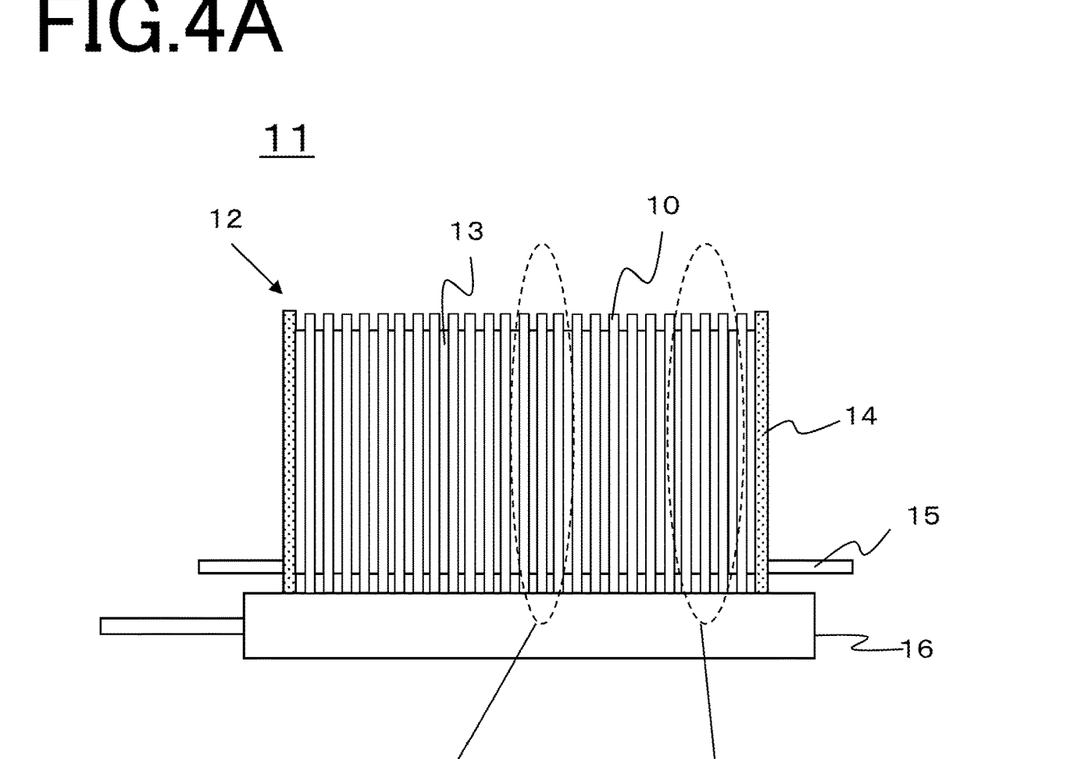
FIG. 4A is a side view schematically illustrating the fuel cell stack device.
Figure 4B:
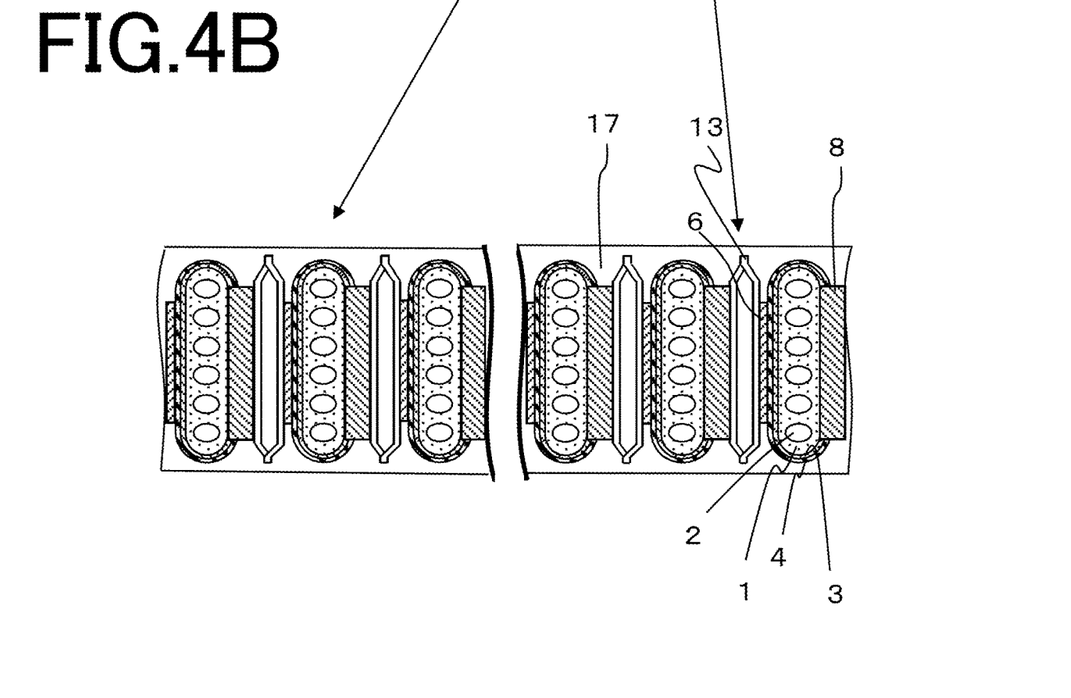
FIG. 4B is a cross-sectional view illustrating enlarged parts of the portions surrounded by broken lines of the fuel cell stack device in FIG. 4A.

FIGS. 4A and 4B illustrate an example of the fuel cell stack device configured by electrically connecting a plurality of the fuel cells 10 described above in series via current collecting members 13. FIG. 4A is a side surface view schematically illustrating a fuel cell stack device 11 and FIG. 4B is a partially enlarged cross-sectional view of the fuel cell stack device 11 of FIG. 4A and illustrates the extracted portions surrounded by the broken lines illustrated in FIG. 4A. Here, in FIG. 4B, the portions corresponding to the portions surrounded by the broken lines illustrated in FIG. 4A are illustrated with arrows for clarity and, in the fuel cell 10 illustrated in FIG. 4B, some of the members described above are omitted from the illustration.

Here, in the fuel cell stack device 11, a fuel cell stack 12 is configured by arranging each of the fuel cells 10 via one of the current collecting members 13, the bottom portion of each of the fuel cells 10 is fixed using an adhesive 17 such as a glass sealing material to an opening of a gas tank 16 for supplying fuel gas to the fuel cells 10. Additionally, an elastically deformable electrically conductive member 14 having a bottom portion fixed to the gas tank 16 is provided sandwiching the fuel cell stack 12, via one of the current collection members 13, from both ends in the arrangement direction of the fuel cells 10.

In addition, in the electrically conductive member 14 illustrated in FIG. 4A, a current lead out section 15 is provided for leading out current generated by the power generation of the fuel cell stack 12 (the fuel cells 10) with a shape extending outward along the arrangement direction of the fuel cells 10.

In the fuel cell stack device 11 of the present embodiment, the fuel cell stack 12 can be configured using the fuel cells 10 described above and, thus, a fuel cell stack device 11 with improved long-term reliability can be obtained.

Figure 5:
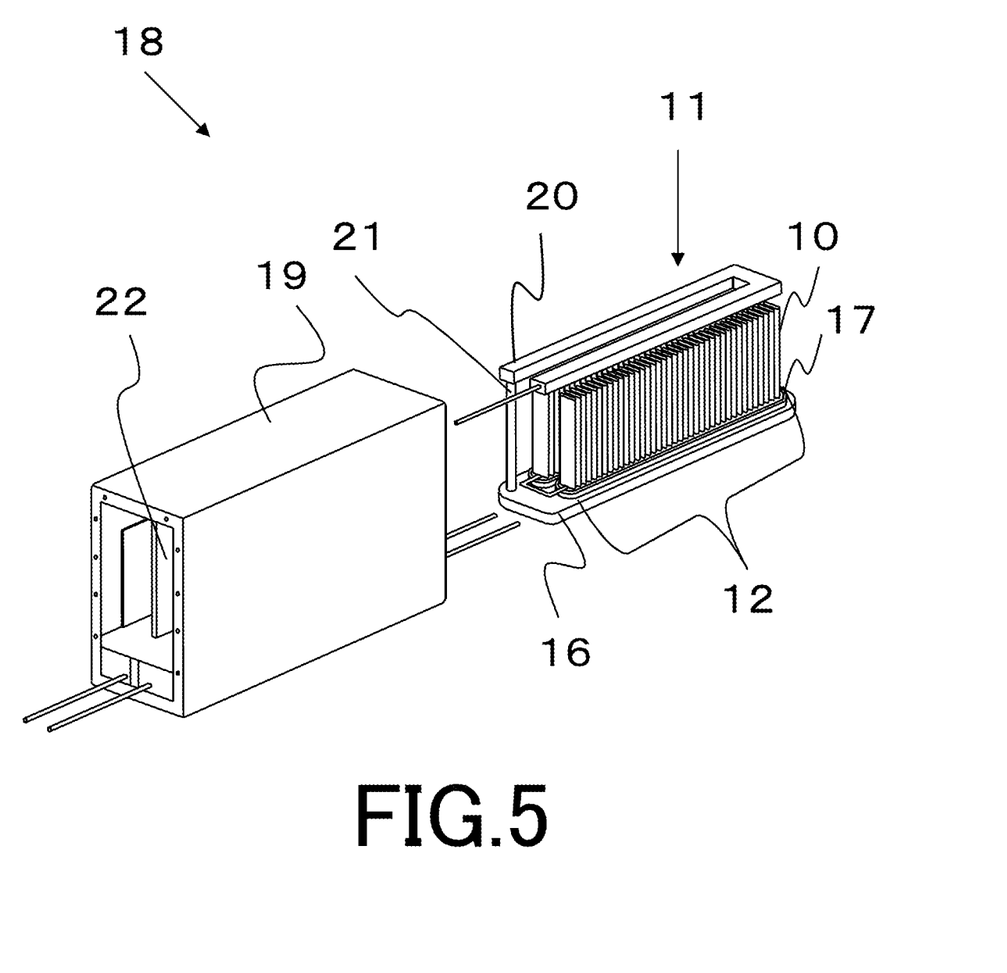
FIG. 5 is an external perspective view illustrating an example of a fuel cell module.

FIG. 5 is an external perspective view illustrating an example of a fuel cell module 18 constituted by the fuel cell stack device 11 housed in a housing container. The fuel cell module 18 is configured such that the fuel cell stack device 11 illustrated in FIGS. 4A and 4B is housed in a rectangular housing container 19.

Here, in order to obtain the fuel gas to be used in the fuel cell 10, a reformer 20 for generating fuel gas by reforming raw materials such as natural gas and kerosene is arranged above the fuel cell stack 12. Then, the fuel gas generated in the reformer 20 is supplied to the gas tank 16 via a gas flow pipe 21 and supplied to the gas-flow passages 2 disposed in the fuel cell 10 via the gas tank 16.

Here, FIG. 5 illustrates a state in which a part (the front and rear surfaces) of the housing container 19 is detached and the fuel cell stack device 11 and the reformer 20 housed in the interior are taken out to the rear. In the fuel cell module 18 illustrated in FIG. 5, the fuel cell stack device 11 can be slid into and housed in the housing 19. Note that, the fuel cell stack device 11 may include the reformer 20.

In addition, in FIG. 5, an oxygen-containing gas introducing member 22 disposed in the housing container 19 is arranged between a pair of fuel cell stacks 12 lined up in the gas tank 16 and oxygen-containing gas is supplied to the lower ends of the fuel cells 10 such that the flow of the oxygen-containing gas is synchronized with the flow of the fuel gas so as to flow at the sides of the fuel cell 10 from the bottom portions toward the top portions. Then, by reacting the fuel gas discharged from the gas-flow passages 2 of the fuel cell 10 with the oxygen-containing gas to be burned at the top portion side of the fuel cell 10, the temperature of the fuel cell 10 can be increased and the activation of the fuel cell stack device 11 can be sped up. In addition, the reformer 20 arranged above the fuel cell 10 (the fuel cell stack 12) can be heated by burning the fuel gas discharged from the gas-flow passages 2 of the fuel cell 10 and the oxygen-containing gas on the top portion side of the fuel cell 10. This allows an efficient reforming reaction performed in the reformer 20.

Furthermore, because the fuel cell stack device 11 described above is housed in the housing container 19 in the fuel cell module 18 of the present embodiment, a fuel cell module 18 with improved long-term reliability can be obtained.

Figure 6:
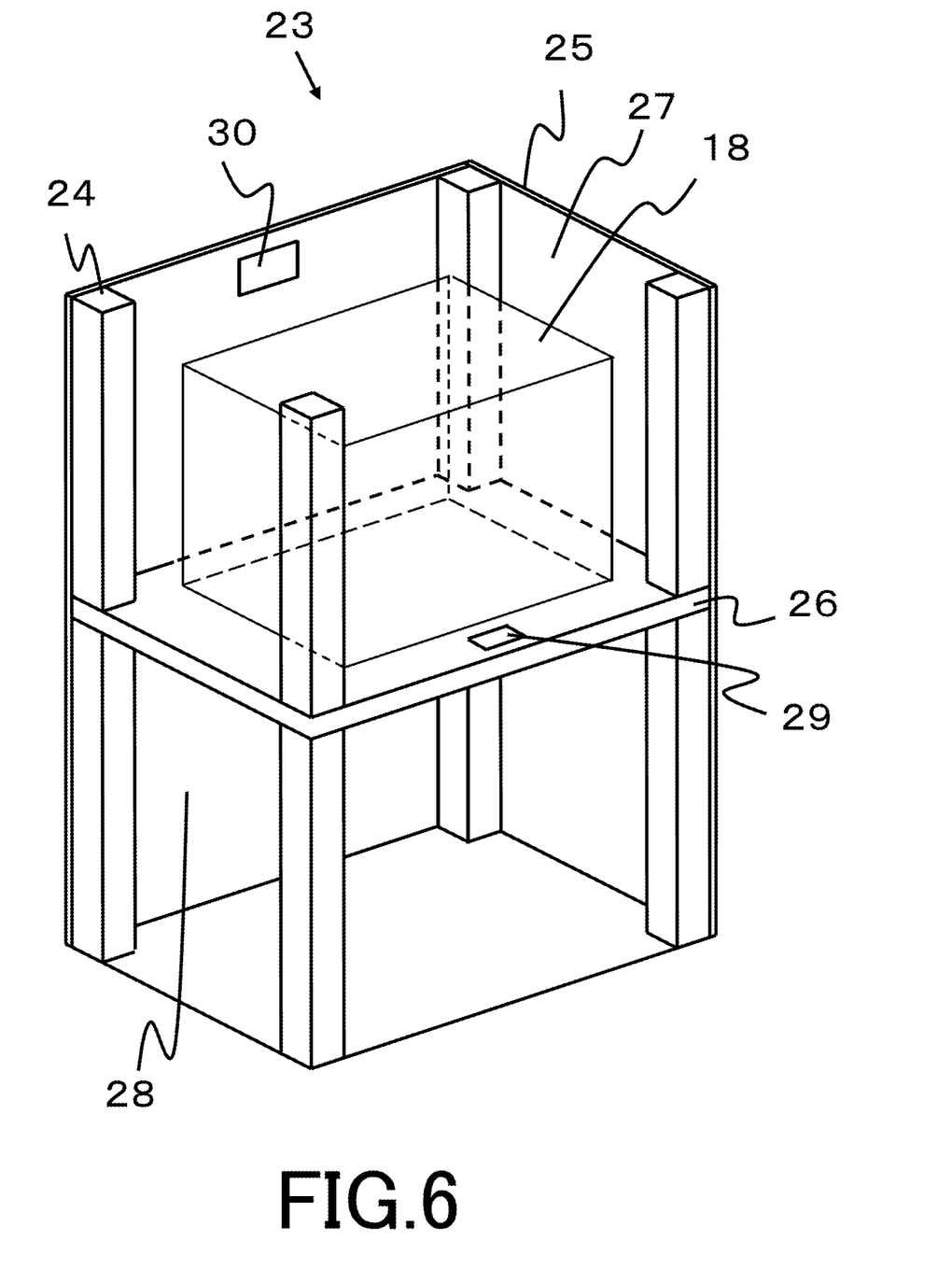
FIG. 6 is a perspective view illustrating a fuel cell device with a part omitted.

FIG. 6 is a perspective view illustrating an example of a fuel cell device in which the fuel cell module 18 illustrated in FIG. 5 and an auxiliary device configured to operate the fuel cell stack device 11 are housed in an external case. Note that some of the components of the configuration are not illustrated in FIG. 6.

In the fuel cell device 23 illustrated in FIG. 6, an outer casing formed of struts 24 and outer plates 25 is divided into an upper and a lower region using a divider 26. The upper region forms a module housing chamber 27 for housing the fuel cell module 18. The lower region forms an auxiliary device housing chamber 28 for housing the auxiliary device configured to operate the fuel cell module 18. Note that the auxiliary device housed in the auxiliary device housing chamber 28 is not illustrated.

Furthermore, an airflow hole 29 for allowing air in the auxiliary device housing chamber 28 to flow into the module housing chamber 27 is formed in the divider 26, and an exhaust hole 30 for exhausting air out of the module housing chamber 27 is formed in one of the outer plates 25 of the module housing chamber 27.

In the fuel cell device 23, as described above, by configuring the fuel cell module 18 for which the reliability can be improved to be housed in the module housing chamber 27, it is possible to obtain the fuel cell device 23 with improved reliability.

Figure 7A:
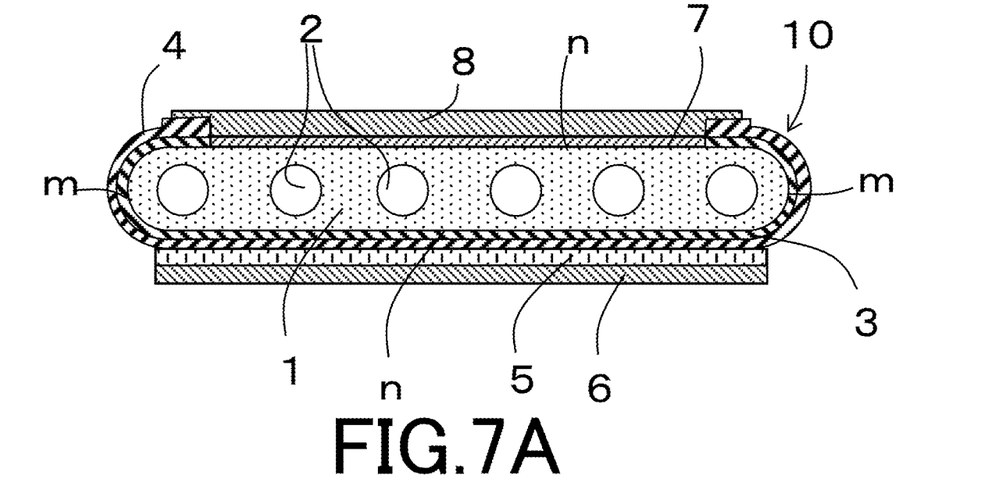
FIG. 7A is a cross-sectional view and FIG. 7B is a side view of FIG. 7A seen from the inter-connector layer side.
Figure 7B:
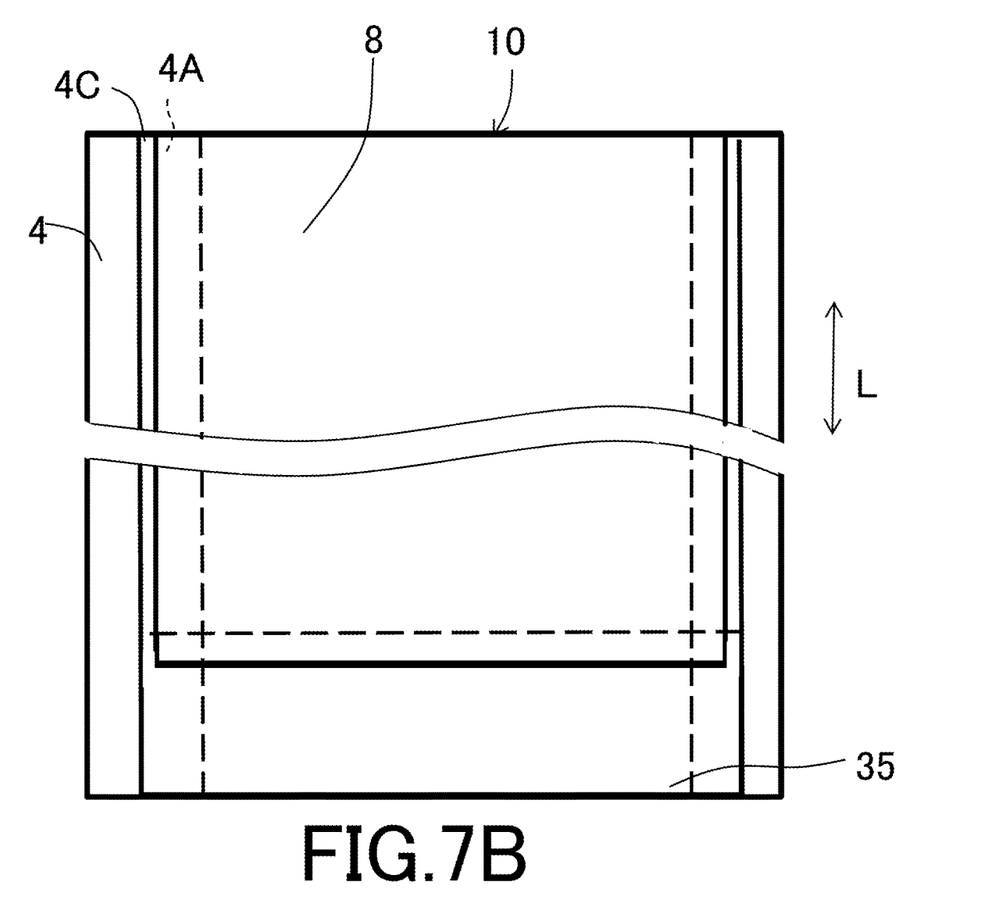

FIGS. 7A and 7B illustrate another embodiment of a type of the cell, namely a fuel cell. In this embodiment, a solid electrolyte layer 4 such as that illustrated in FIGS. 1A to 2 is provided and, as illustrated in FIG. 7B, a reinforcing layer 35 made from a dense sintered member containing Zr is formed on the bottom portion of the electrically conductive support body 1 in place of the inter-connector layer 8.

Specifically, the pair of end portions of the reinforcing layer 35 made from a dense sintered member containing Zr are overlapped on the pair of end portions of the solid electrolyte layer 4 on the bottom portion of the electrically conductive support body 1, and the bottom edge of the inter-connector layer 8 is overlapped on the top edge of the reinforcing layer 35.

The reinforcing layer 35 is formed from the same materials as the solid electrolyte layer 4. Additionally, from the perspective of attaining high strength, for example, the reinforcing layer 35 is preferably $ZrO_2$ containing 8 mol % or less and more preferably from 3 to 6 mol % of $Y_2O_3$ or a similar rare earth element oxide.

The reinforcing layer 35 described above extends from one end to the other in the length direction of the fuel cells 10. Additionally, a thickness of the reinforcing layer 35 is about 5 to 30 μm.

Figure 8:
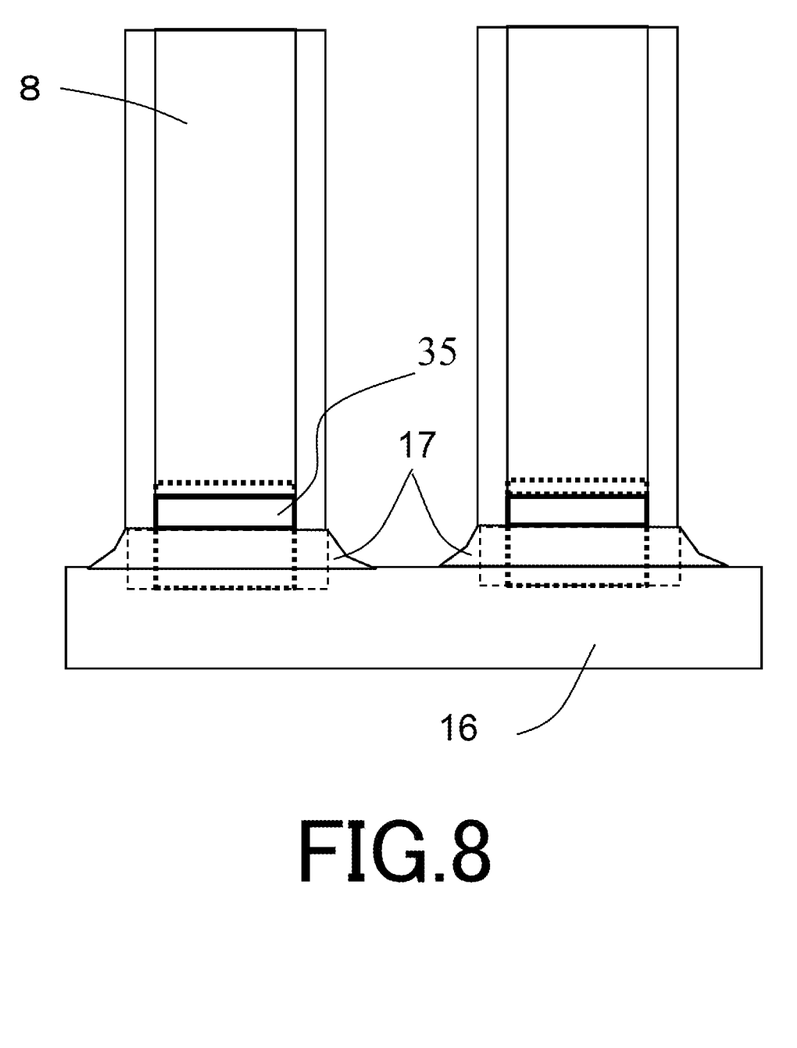
FIG. 8 is a side view illustrating a state where the bottom portions of the fuel cells are joined to opening portions of a gas tank using an adhesive.

FIG. 8 illustrates a structure in which the fuel cells 10 are fixed to the gas tank 16. Bottom portions of the fuel cells 10 are inserted into openings formed on the top surface of the gas tank 16 and fixed by an adhesive 17 such as a glass sealing material or the like; and top portions of the reinforcing layers 35 are exposed. In other words, the bottom portion of the inter-connector layer 8 is positioned at a predetermined spacing from the top surface of the adhesive 17 and the top portion of the reinforcing layer 35 is exposed therebetween. In such a fuel cell 10, cracking in the bottom portion of the fuel cell 10 can be prevented.

The invention is not limited to the above-described embodiment, and various modifications, improvements and the like may be made to the embodiment without departing from the scope of the invention.

For example, description was given of a hollow, flat solid oxide fuel cell in the embodiment described above; however, naturally, banded solid oxide type fuel cells may be used. Additionally, various intermediate layers may be formed between each of the members in accordance with the functions.

Furthermore, in the embodiment described above, description was given of a fuel cell, a fuel cell stack device, a fuel cell module, and a fuel cell device. However, the present invention is not limited thereto and application is also possible to an electrolytic cell (SOEC) which generates hydrogen and oxygen ($O_2$) by electrolyzing water vapor (water) by applying water vapor and voltage in a cell and to an electrolytic module and an electrolytic device provided with this electrolytic cell.

EXAMPLES

First, an electrically conductive support body compact was manufactured by mixing NiO powder having an average particle size of 0.5 μm and $Y_2O_3$ powder having an average particle size of 0.9 μm such that a volume ratio after firing and reduction was 48 volume % of the NiO to 52 volume % of the $Y_2O_3$, forming clay prepared in a solvent with an organic binder using an extrusion forming method, and then drying and degreasing the result.

Next, a solid electrolyte layer sheet was manufactured via a doctor blade method using a predetermined slurry such that the post-firing thicknesses of the first portion and the second portion were the average thicknesses shown in Table 1. Additionally, as shown in Table 1, the solid electrolyte layers of Sample Nos. 3, 4, 10, and 11 were integrally formed. On the other hand, the other solid electrolyte layers of Sample Nos. 1, 2, and 5 to 9 were formed having a first layer and a second layer.

In the cases where the solid electrolyte layer was integrally formed, a slurry was prepared by mixing an organic binder and a solvent in $ZrO_2$ powder (solid electrolyte layer raw material powder) in which 8 mol % of $Y_2O_3$ was dissolved and with a particle diameter of 0.8 μm according to a micro-track method.

Additionally, in the cases where the solid electrolyte layer included the first layer and the second layer, a slurry was prepared by mixing an organic binder and a solvent such that the rare earth element-containing $ZrO_2$ compounds shown in Table 1 were obtained for each of the first layer and the second layer.

Additionally, a composite oxide including 96 mol % of $CeO_2$, which is oxide for forming the anti-reaction layer compact, and 4 mol % of $Gd_2O_3$ was pulverized with a vibration mill or ball mill using isopropyl alcohol (IPA) as a solvent, a calcination treatment was performed for four hours at 900° C., a crushing treatment was carried out again in the ball mill, the degree of aggregation of the ceramic particles was adjusted, an acrylic binder and a toluene were added to this powder and the result was mixed to produce the slurry for forming the anti-reaction layer powder compact.

Next, a fuel electrode layer slurry was manufactured, in which NiO powder with an average particle size of 0.5 μm, $ZrO_2$ powder in which $Y_2O_3$ was dissolved, an organic binder, and a solvent were mixed, and then this slurry was coated and dried on a solid electrolyte layer sheet using a screen printing method to form a fuel electrode layer compact. Next, the slurry for forming the anti-reaction layer powder compact was coated and dried on the solid electrolyte layer sheet on the surface of the side opposite the surface where the fuel electrode layer compact was formed, using a screen printing method.

A sheet-shaped laminated compact in which the anti-reaction layer powder compact and the fuel electrode layer compact were formed on both surfaces of the solid electrolyte layer sheet was laminated at a predetermined position on the electrically conductive support body compact with the surface of the fuel electrode layer compact side on the inside.

Next, the laminated compact in which the compacts were laminated described above was subjected to calcination treatment for 3 hours at 1000° C.

Next, an inter-connector layer slurry was produced in which La ($Mg_{0.3}Cr_{0.7})_{0.96}O_3$, an organic binder, and a solvent were mixed.

Raw materials formed of Ni and YSZ were mixed and dried and the adhesive layer slurry was adjusted by mixing an organic binder and solvent. The adjusted adhesion layer slurry was coated on a portion (a portion where the electrically conductive support body is exposed) where the fuel electrode layer of the electrically conductive support body (and the solid electrolyte layer) was not formed to laminate a cohesion layer compact, and the inter-connector layer slurry was coated on the pair of end portions of the solid electrolyte layer compact and the adhesive layer compact.

Next, the laminate compact described above was subjected to a binder removal treatment, and co-firing was carried out in an oxygen-containing atmosphere for 2 hours at 1450° C.

Next, a mixed solution formed of $La_{0.6}Sr_{0.4}Co_{0.2}Fe_{0.8}O_3$ powder with an average particle diameter of 2 μm and isopropyl alcohol were produced and spray-coated on the surface of the anti-reaction layer of the laminated sintered member, to form an oxygen electrode layer compact. Then, baking was carried out for 4 hours at 1100° C., to form an oxygen electrode layer. Thus, the fuel cell illustrated in FIGS. 1A and 1B was manufactured. Sample Nos. 1 to 9 are Working Examples, and Sample Nos. 10 and 11 are Comparative Examples.

Here, the dimensions of the manufactured fuel cell were 25 mm×200 mm, the thickness of the electrically conductive support body (the thickness between the flat faces n) was 2 mm and the apparent porosity thereof was 35%, the thickness of the fuel electrode layer was 10 μm and the apparent porosity thereof was 24%, the thickness of the solid electrolyte layer was 50 μm and the apparent porosity thereof was 40%, and the relative density of the solid electrolyte layer was 97%. The thickness measurements of the first portions and the second portions in the table are average thicknesses, measured using a scanning electron microscope (SEM) photograph, and the results are recorded in Table 1.

Next, hydrogen gas was supplied into the fuel cell, and the electrically conductive support body and the fuel electrode layer were subjected to reducing treatment for 10 hours at 850° C.

The obtained fuel cells were examined using a scanning electron microscope (SEM) for gas leakage from the portions where the solid electrolyte layer and the inter-connector layer were overlapped. The results are recorded in Table 1.

Specifically, gas leakage testing was performed in which, the fuel cell, in which the gas-flow passage on one side was sealed using a predetermined material, was placed in water and He gas pressurized to 3 kg/cm² was supplied for 60 seconds from the other side of the gas-flow passage of the fuel cell. When air bubbles formed from the edge of the inter-connector layer, the sample was evaluated to not have gas blocking properties and when air bubbles did not form, the sample was evaluated to have gas blocking properties. Testing results are recorded in Table 1.

Power density (0.3 A/cm$^2$, 750° C.) of the cell was measured as power generation performance. Measurement results are recorded in Table 1.

TABLE 1

| | | | Solid electrolyte layer composition | | | | | | |
|---|---|---|---|---|---|---|---|---|---|
| | Solid electrolyte layer | Solid electrolyte layer | Cases where integrally formed | | Cases including first layer and second layer | | | | |
| | | | | | First layer | | Second layer | | Gas |
| Sample No. | First portion Thickness (μm) | Second portion Thickness (μm) | Rare earth element oxide | Amount (mol %) | Rare earth element oxide | Amount (mol %) | Rare earth element oxide | Amount (mol %) | leakage Present or Absent | Power generation performance (W/cm$^2$) |
| 1 | 16 | 6 | — | | $Y_2O_3$ | 8 | $Y_2O_3$ | 4 | Absent | 0.255 |
| 2 | 13 | 8 | — | | $Y_2O_3$ | 8 | $Y_2O_3$ | 4 | Absent | 0.252 |
| 3 | 20 | 10 | $Y_2O_3$ | 8 | | | — | | Absent | 0.25 |
| 4 | 25 | 15 | $Y_2O_3$ | 8 | | | — | | Absent | 0.249 |
| 5 | 18 | 8 | — | | $Y_2O_3$ | 8 | $Yb_2O_3$ | 8 | Absent | 0.252 |
| 6 | 18 | 8 | — | | $Y_2O_3$ | 8 | $Y_2O_3$ | 4 | Absent | 0.251 |
| 7 | 23 | 8 | — | | $Y_2O_3$ | 8 | $Y_2O_3$ | 4 | Absent | 2.5 |
| 8 | 33 | 8 | — | | $Y_2O_3$ | 8 | $Y_2O_3$ | 4 | Absent | 0.249 |
| 9 | 38 | 8 | — | | $Y_2O_3$ | 8 | $Y_2O_3$ | 4 | Absent | 0.25 |
| 10 | 40 | 30 | $Y_2O_3$ | 8 | | | — | | Absent | 0.23 |
| 11 | 8 | 8 | $Y_2O_3$ | 8 | | | — | | Present | 0.232 |

It is clear from the results shown in Table 1 that in Sample Nos. 1 to 9, namely the Working Examples, in cases where the first portion was thicker than the second portion, there were no gas leakage and power generation performance were excellent at 0.249 W/cm$^2$ or greater. In contrast, in Sample No. 10 where the thickness of the second portion was greater than 15 μm, power generation performance was insufficient due to the excessive thickness. Additionally, in Sample No. 11 where the thickness of the first portion and the second portion was the same, gas leakage occurred and power generation performance was low.

REFERENCE SIGNS LIST

1 Electrically conductive support body
2 Gas-flow passage
3 Fuel electrode layer
4 Solid electrolyte layer
4A First portion
4B Second portion
4C Third portion
4a $La_2Zr_2O_7$ layer
6 Oxygen electrode layer
8 Inter-connector layer
11 Fuel cell stack device
18 Fuel cell module
23 Fuel cell device

What is claimed is:
1. A cell comprising:
a solid electrolyte layer made from a $ZrO_2$-based sintered member;
an inter-connector layer
containing a La-containing perovskite composite oxide; and
comprising a pair of end portions of the inter-connector layer covering a pair of end portions of the solid electrolyte layer;
an outer electrode layer disposed outward of the solid electrolyte layer; and
an inner electrode layer disposed inward of the solid electrolyte layer,
wherein the solid electrolyte layer comprises:
a first portion overlapping the pair of end portions of the inter-connector layer,
a second portion disposed between the outer electrode layer and the inner electrode layer and having an average thickness of 15 μm or less, and
a third portion adjacent to the first portion, not overlapping with the pair of end portions of the inter-connector layer,
wherein the first portion and the third portion are both thicker than the second portion.
2. The cell according to claim 1, wherein
the first portion is made from a $ZrO_2$-based sintered member containing a rare earth element oxide, and comprises:
a first layer; and
a second layer disposed closer to the inter-connector layer than the first layer in the direction of the thickness of the first portion of the solid electrolyte layer,
wherein the second layer has a lower rare earth element oxide content than the first layer.
3. The cell according to claim 2, wherein
the inter-connector layer contains a rare earth element oxide; and
the second layer comprises a near portion adjacent to the inter-connector layer and a far portion opposite the near portion and adjacent to the first layer,
wherein the near portion contains a greater content of the rare earth element greater than the far portion in the thickness direction of the first portion of the solid electrolyte layer.
4. The cell according to claim 1, wherein
the first portion:
is made from a $ZrO_2$-based sintered member containing a rare earth element oxide; and has a greater Zr content in a central portion thereof than in a near portion adjacent to the inter-connector layer in the thickness direction.

5. The cell according to claim 1, wherein the first portion has an average thickness of 20 μm or greater.

6. A cell stack device comprising:
a plurality of the cells according to claim 1; and
current collection members in electrical connection with the plurality of cells.

7. A module comprising:
the cell stack device according to claim 6; and
a housing container containing the cell stack device therein.

8. A module-containing device comprising:
the module according to claim 7;
an auxiliary device configured to operate the module; and
an external case containing the module and the auxiliary device therein.

9. The cell according to claim 1, wherein
the solid electrolyte layer made from a $ZrO_2$-based sintered member contains 85 mol % or greater of $ZrO_2$.

10. The cell according to claim 1, wherein
the third portion comprises a region extending completely across the third portion in a thickness direction thereof, in which the region has a composition that is substantially the same as a composition of the second portion.

11. The cell according to claim 1, wherein
the inter-connector layer constitutes an annular member with the solid electrolyte layer.

12. A cell comprising:
a solid electrolyte layer comprising a $ZrO_2$-based member and comprising a pair of end portions;
an inter-connector layer
containing a La-containing perovskite composite oxide; and
comprising a pair of end portions of the inter-connector layer;
an outer electrode layer disposed outward of the solid electrolyte layer; and
an inner electrode layer disposed inward of the solid electrolyte layer,
wherein the solid electrolyte layer comprises:
a first portion overlapping the pair of end portions of the inter-connector layer, and
a second portion disposed between the outer electrode layer and the inner electrode layer and having an average thickness of 15 μm or less, and
wherein the first portion is thicker than the second portion and the first portion is parallel to the second portion.

13. The cell according to claim 12, wherein the solid electrolyte layer further comprises
a third portion adjacent to the first portion, not overlapping with the pair of end portions of the inter-connector layer, and having a thickness greater than that of the second portion.

14. The cell according to claim 12,
wherein the pair of end portions of the inter-connector layer are thinner than a main portion of the interconnector layer.

15. The cell according to claim 12,
wherein the first portion of the solid electrolyte layer abuts two different surfaces of the inter-connector layer.

16. The cell according to claim 12, wherein
the inter-connector layer constitutes an annular member with the solid electrolyte layer.

17. A cell comprising:
a solid electrolyte layer comprising a $ZrO_2$-based member and comprising a pair of end portions;
an inter-connector layer
containing a La-containing perovskite composite oxide; and
comprising a pair of end portions of the inter-connector layer;
an outer electrode layer disposed outward of the solid electrolyte layer; and
an inner electrode layer disposed inward of the solid electrolyte layer,
wherein the solid electrolyte layer comprises:
a first portion overlapping the pair of end portions of the inter-connector layer, and
a second portion disposed between the outer electrode layer and the inner electrode layer and having an average thickness of 15 μm or less, and
wherein the first portion is thicker than the second portion and
the pair of end portions of the inter-connector layer are thinner than a main portion of the interconnector layer.

18. The cell according to claim 17, wherein the solid electrolyte layer further comprises
a third portion adjacent to the first portion, not overlapping with the pair of end portions of the inter-connector layer, and having a thickness greater than that of the second portion.

19. The cell according to claim 17, wherein
the inter-connector layer constitutes an annular member with the solid electrolyte layer.

* * * * *